May 3, 1955
M. E. STECZYNSKI
2,707,336
PIPE THREAD GAUGES
Filed Feb. 18, 1950
2 Sheets-Sheet 1
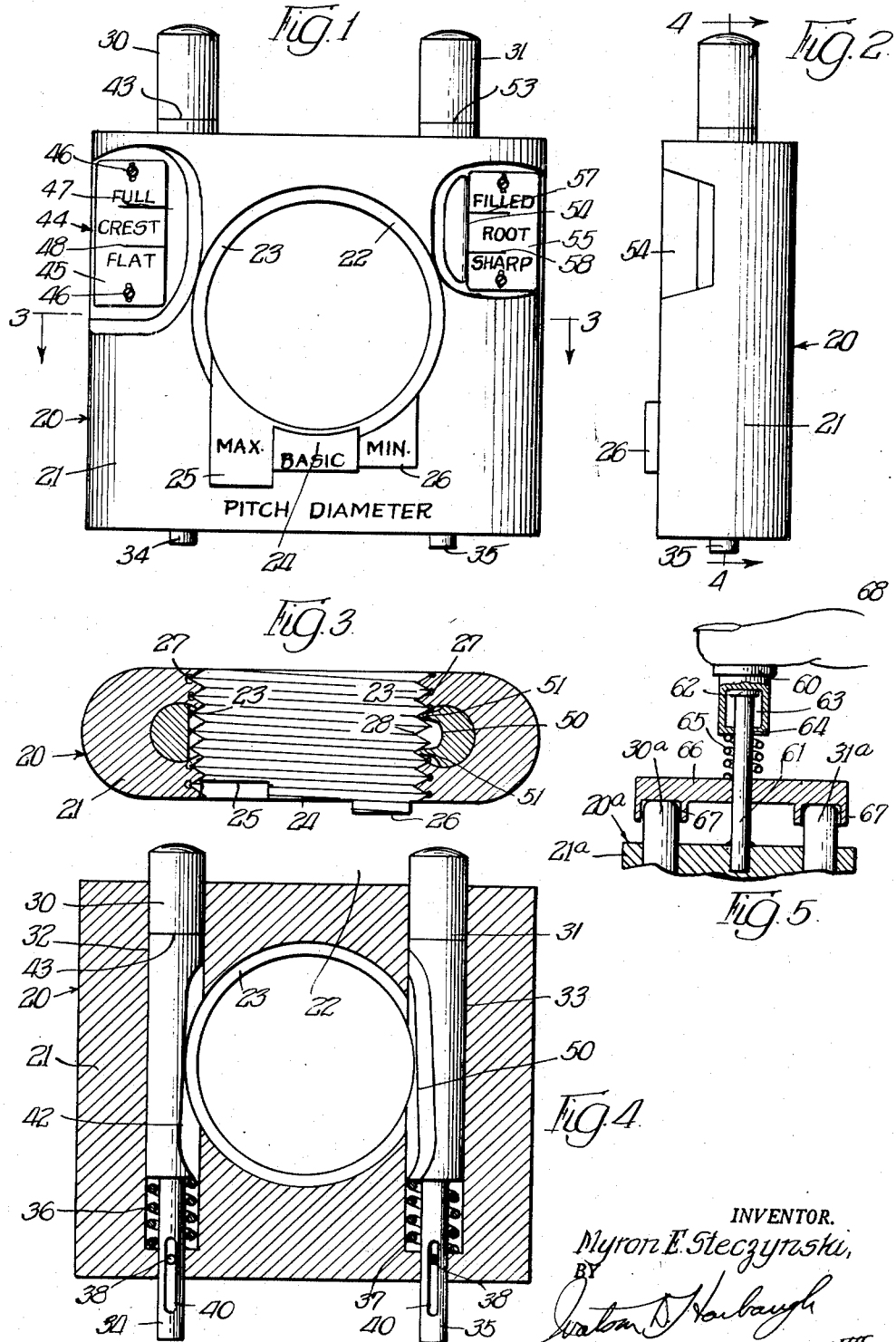
INVENTOR.
Myron E. Steczynski,

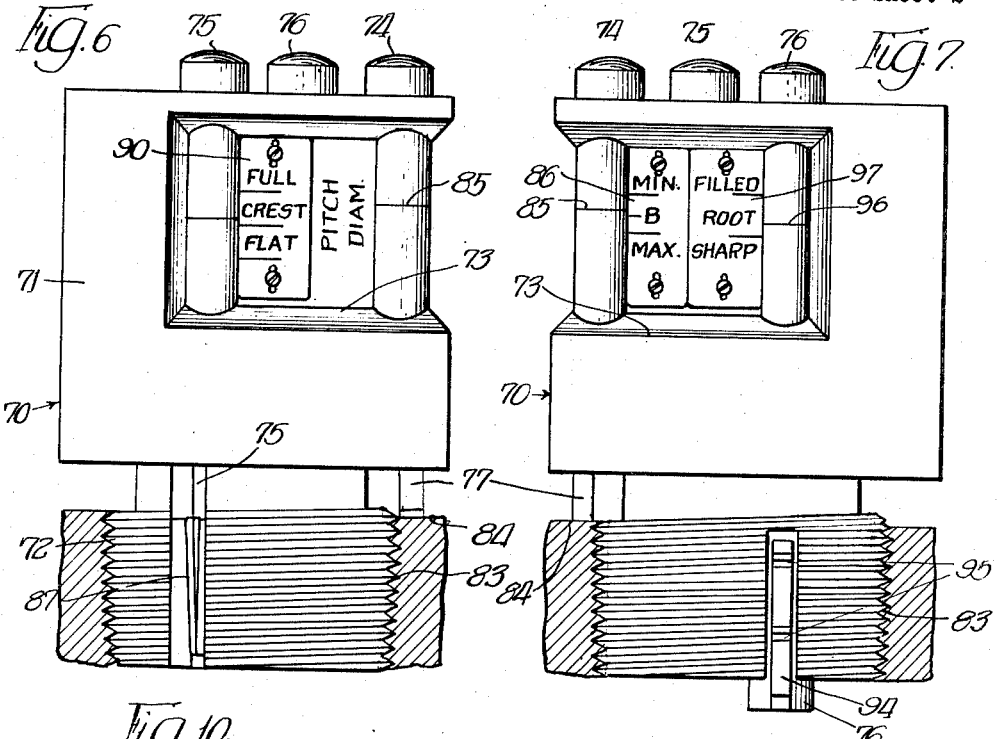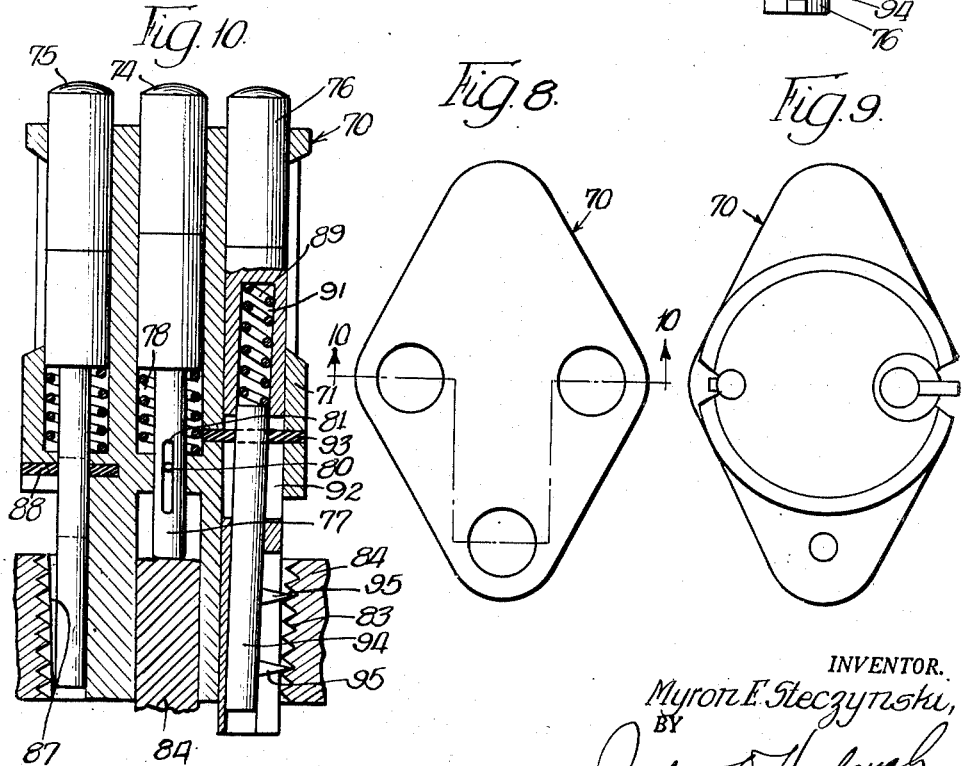

United States Patent Office 2,707,336
Patented May 3, 1955

2,707,336

PIPE THREAD GAUGES

Myron E. Steczynski, Chicago, Ill.

Application February 18, 1950, Serial No. 144,870

8 Claims. (Cl. 33—199)

This invention relates generally to thread gauges and more particularly to improved gauges for tapered pipe threads.

Pipe threads differ basically from ordinary machine screw threads in that the former are intended to form a fluid-tight or gas-tight coupling or seal when made up into a joint rather than merely to hold two members together. In order to effect this seal, most pipe threads are tapered, as if they were wound around a truncated cone, so that the pitch diameter or circle at the lead end is less than that at the butt end in the case of male threads, and vice versa in the case of female threads. Thus when a pipe joint is made up, the engagement of the thread surfaces becomes progressively tighter as the elements are threaded together.

Since a seal is effected by the mating of the threads of the joint, the condition of the crest and the root of both the male and female threads is of particular importance, for these portions of the threads must make up tightly or leakage will occur along either or both of the two spiral paths defined by any clearance existing between the crest and the root at the top and bottom of each thread. In order to prevent such leakage, luting compounds are frequently employed to fill the spaces at the crests and roots of the threads. However, if too much clearance is left at these points, the compound is ineffective to withstand high pressures or does not completely fill the spaces. If too much interference is created at mating crests and roots, the joint cannot be made up tightly, and leakage may occur along the inclined surfaces of the threads instead of at the root and crest. In other instances, luting compounds may not be used at all, for the compound might contaminate the fluid being conducted through the pipe or tend to create a hazard which may be mechanical or chemical.

Thus in order to insure that a satisfactory pipe joint will result, it is necessary that the root and crest of each of the threads comprising the joint conform to each other and the thread have the standard specified form. In the case of threads which are to be used without luting compound, the roots are machined so as to be filled more than the crests so that the crest of the mating thread will actually cut into the root to make up therewith in a solid metal to metal contact. Thus, in order to achieve interchangeability of the pipe and fittings, it is essential, particularly when high pressures or dry sealing are involved, that the threads be gauged after cutting in order to insure that they will conform to fundamental standards which from experience are known to make up satisfactorily.

In gauging pipe threads, three factors have been found to be particularly important, namely, the thread angle and its basic pitch diameter, the shape or sharpness of the root of the thread, and the shape or flatness of the crest.

Since pipe threads are usually cut by tapered taps or dies which are carefully machined, the angle of taper of a thread is usually correct. However, if the die or tap is run too far onto or into the workpiece, the leading end of the thread will be too small in diameter in the case of male threads and too large in the case of female threads so that proper engagement with a mating thread may not be achieved. The opposite effect is produced if the tap or die is excessively worn or is not threaded far enough onto the workpiece. Also, if the die is excessively worn, the root of the thread tends to be too full or rounded with the thread thickened slightly. Either condition is likely to result in a leaky joint.

One object of this invention is to provide a simple gauge which will give a ready indication of the actual condition of the thread, taking into account not only the shape of the crest and root of the thread but also determining the pitch diameter of the thread.

Another object of this invention is to provide a gauge which will indicate the reason for the rejection of the thread, namely, whether it has, (1) wrong basic pitch diameter, (2) excessive flatness or sharpness at the crest, or (3) excessive fullness or sharpness at the root, so that the gauged threads may be either classified as to fit or may be salvaged by reworking where possible.

Another object is to provide gauges operating on the same principle and functioning in the same manner for male and female threads.

Another object is to provide a gauge which is direct reading, no interpolation or other mathematical computation being required.

The method of gauging threads prior to this time involved several gauges and many computations, most of which were indefinite interpolations, in order to determine the suitability of the thread. Accordingly, another object of this invention is to provide a single gauge into or onto which the thread is screwed, a simple operation then being all that is required to determine the critical thread conditions.

A further object is to provide a gauge which may be readily adapted for automatic or semi-automatic operation so as to speed the gauging operation and reduce the expense thereof and which is faster than conventional gauging methods even when the gauging is done manually.

Other objects and advantages of this invention will present themselves to those familiar with the art on reading the following specification in conjunction with the drawings and the appended claims.

In the drawings—

Fig. 1 is a front view of a gauge for male pipe threads constructed according to this invention;

Fig. 2 is a side view of the gauge;

Fig. 3 is a horizontal section taken on line 3—3 of Fig. 1;

Fig. 4 is a vertical section taken on line 4—4 of Fig. 2, the movable elements being show in the gauging position;

Fig. 5 is a vertical section similar to Fig. 4 showing a portion of a modified form of the gauge adapted for simultaneous operation of both plungers;

Fig. 6 is a front view of a gauge for female threads constructed according to this invention;

Fig. 7 is a side view thereof;

Fig. 8 is a top view of the female thread gauge;

Fig. 9 is a bottom view thereof; and

Fig. 10 is a vertical section showing the internal construction of the gauge taken on line 10—10 of Fig. 8.

The fundamental principle of this invention is to provide a gauge having a tapered thread thereon which is screwed to the thread to be gauged. The tapered thread of the gauge is machined so that it contacts only the side portions of the thread being gauged approximately at the pitch diameter and not the root and crest thereof. Initially the basic pitch diameter of the thread being gauged is determined by measuring the length of engagement of the two threads, the gauging thread being undercut so as to make contact only at the middle portions of the thread sides when one is screwed home into the other. A pair of movable feeler elements are provided in the gauge, and after the threads are screwed together the feelers are moved toward the thread to be gauged until one of them contacts the crest of the thread and the other contacts the root. The degree of inward movement of each of the feeler elements is readily observable to give a visual indication of the depth of the root and the flatness of the crest.

A ring gauge 20 for gauging male pipe threads is shown in Figs. 1 to 4 of the drawings. The gauge 20 comprises a substantially rectangular body 21 having rounded ends for convenience in handling and a tapered threaded opening 22 therethrough into which the thread to be gauged is screwed. The thread 23 in the central opening 22 is machined to have as nearly as possible the same taper as that specified for the thread to be gauged. At the smaller end of the hole 22 a series of steps 24 which indicate the basic pitch diameter are provided by means of an undercut 25 at one side and a projection 26 at the opposite side. The root portion 27 of the thread 23 is undercut as shown in Fig. 3 and the crest portion 28 is flattened to provide ample clearance so that only the intermediate side portions of the thread to be gauged will engage the thread 23 when the workpiece is screwed into the gauge 20.

Since the thread 23 and the thread to be gauged are both tapered, the basic pitch diameter or the pitch diameter at the small end of the thread of the latter determines how far the thread may be screwed into a gauge. The stepped portions 24 are so machined with respect to the thread 23 that threads having excessive basic pitch diameters will be screwed home in the gauge before the end of the piece reaches the step 25 labeled "Max." in Fig. 1. Threads having a basic pitch diameter smaller than the minimum acceptable value will project beyond the step 26 labeled "Min." in Fig. 1. Thus by simply threading the piece into the gauge until it is all the way home, the basic pitch diameter is readily gauged and the inspector may tell at a glance whether it lies within the acceptable limits or must be rejected. Since the thread 23 in the gauge is machined to leave ample crest and root clearances, the basic pitch diameter is measured regardless of any irregularities at the root or crest of the gauged thread, for only the inclined side portions of the two threads make contact.

To gauge the root and the crest of the thread, a pair of plungers 30 and 31 are provided. These plungers are movably received in bores 32 and 33, respectively, which are perpendicular to the hole 22 and intersect the edges thereof on opposite sides. The bottom portions of the bores 32 and 33 are of a smaller diameter to receive the necked portions 34 and 35 provided on the bottom of the plungers 30 and 31. Springs 36 and 37 are provided in the bottom of the bores 32 and 33 and urge the plungers 30 and 31 upwardly. Vertical motion of the plungers in the bores is limited by stop pins 38 which are mounted in the body 21 and pass through elongated slots 40 provided in the necked portions 34 and 35. Thus movement of the plungers is limited to the length of the slots 40, and, once the pins 38 have been inserted, the various elements are held together. The pins and slots also perform an additional function in that they prevent rotation of the plungers 30 and 31 in the bores 32 and 33.

The side of the plunger 30 is undercut as shown at 42 to provide an inclined feeler surface which engages the crest portions of the thread being gauged when the plunger 30 is moved downwardly. Since the thread being gauged is supported solely on the inclined side portions substantially at the pitch diameter, and, since the feeler surface 42 is inclined, the difference between the pitch diameter of the thread being gauged and the crest diameter thereof determines the amount of movement of the plunger 30 as it is pressed downwardly by the inspector's finger, the top of the plunger 30 being rounded to provide a convenient push-button surface.

To visually indicate the amount of movement, the plunger 30 is provided with a witness or index line 43, and when the plunger is depressed as a thread is being gauged, this line is visible through an opening or window 44 machined in the side of the body 20. A movable scale plate 45 is supported by a pair of screws 46 alonside the window 44. This plate has two lines 47 and 48 labeled, respectively, "Full" and "Flat" which correspond to the tolerance limits of the crest of the thread to be gauged. The plate 45 may be moved either up or down with respect to the body to calibrate the gauge simply by loosening the screws 46, or the plate may be removed and replaced by a plate having limit lines which are spaced apart a different distance if a different tolerance is specified. A graduated scale plate may be used where exact measurement is desired.

The plunger 31 is substantially the same as the plunger 30 except that the thread engaging feeler surface 50 is machined to have a plurality of wedge-shaped projections 51 thereon which engage the root of the thread to be gauged when the plunger 31 is pressed downwardly. For 60° threads it is preferred that the angle of divergence of the sides of the projections 51 be approximately 40° and that the peak portions thereof be flattened to such an extent that the width of the flat part is approximately half the minimum acceptable width at the root of the thread to be gauged. Thus it is insured that the feeler surface 50 will engage only the root portion of the thread to be gauged and still will have sufficient body for long wear. It is preferred that the feeler surfaces 42 and 50 of each of the plungers be hardened so as to give long wearing qualities. A witness line 53 is provided on the plunger 31 similar to the line 43 on the plunger 30. This line is observable during gauging through a window 54 similar to the window 44. The plate 55 is similar to the plate 45 except that it is inscribed to indicate the condition of the root of the thread rather than the crest. It also is movable up and down and may be replaced by other plates, if desired. Thus the plunger 31 effectively measures the difference between the root diameter and the pitch diameter of the thread being gauged just the same as the plunger 31 measures the distance between the crest diameter and the pitch diameter, and the two plungers together give a readily obtainable visual indication of the condition of the crest and root of the thread.

To use the gauge 20, the operator merely screws the work into the opening 22 until the engagement is snug. He then turns the gauge slightly so that he can see the small end of the threaded piece and checks to see whether it projects beyond the undercut 25 and lies within the step 26. If it does both, the basic pitch diameter is satisfactory. He then presses the plunger 30 downwardly until its movement is checked by the feeler surface contacting the crest of the thread and looks through the window 44 to see the position of the witness line 43. If this line lies between the lines 47 and 48, the crest of the thread is satisfactory. Next, or simultaneously, he presses the plunger 31 downwardly until movement is checked as the wedge-shaped projections 51 contact the root of the thread to be gauged and looks through the opening 54 to see the position of the witness line 53. If this line lies between the scribed lines 57 and 58 on the plate 55, the root of the thread is satisfactory. The gauging operation is now complete and the workpiece may be unscrewed from the gauge. In the event that the defect is such that the thread may be reworked, for example the crest is too sharp, the root is not sharp enough, or the basic pitch diameter is too large, this fact is known and the piece may be sent back for remachining. If the basic pitch diameter is too small, cutting off the end of the piece may save it. If the piece is unsalvageable, it should be scrapped.

By the use of this gauge, an alert operator or inspector can determine in advance that the thread-cutting dies are becoming worn in order that they may be replaced before parts have been machined which must be rejected. If desired, the gauge may be calibrated to give actual measurements of the difference between the crest and pitch diameter and the root and pitch diameter in order that threads may be classified as to these conditions for subsequent matching with mating threads having corresponding fullness or flatness of crest or root.

In Fig. 5 a modified form of gauge 20a is shown having a single finger button 60 which simultaneously imposes the proper force for most accurate gauging on the plungers 30a and 31a. The gauge 20a is substantially the same as the preferred embodiment except that a stud 61 which supports the finger button 60 is secured to the top of the body 21a midway between the plungers 30a and 31a. The top of the stud 61 is machined to have a head 62 thereon, and the finger button 60 is axially bored to accommodate the head 62. As indicated at 63, the mouth of the bore 63 is bent inwardly to provide a smaller opening 64 slightly larger than the diameter of the stud 61. Thus the finger button 60 is retained on the stud 61 and is movable with respect thereto a distance equivalent to the length of the bore 63. Beneath the finger button 60 a coil spring 65 which surrounds the stud 61 is provided. The lower end of this spring bears against a beam-like member 66 which is freely movable up and down the stud 61. The ends of the member 66 have projections 67 thereon which are hollowed to receive the upper ends of the plungers 30a and 31a.

When the finger button 60 is pressed all the way down, the spring 65 is compressed and exerts a downward force on the beam 66 which forces the plungers 30a and 31a downwardly. The size of the spring 65 is such that the force required to compress it is greater than the force required to compress both of the springs 36 and 37 (Fig. 3). Thus the members 30a and 31a are moved downwardly to the gauging position just the same as they are in the preferred embodiment when finger pressure is applied, except that both may be moved downwardly by merely moving one finger. Furthermore, the pressure applied to the plungers is uniform regardless of how hard the operator's finger 68 is pressed against the button 60. For precision gauging this modification is preferred, for the element of skill on the part of the operator is eliminated, and accurate gauging will result regardless even if an inexperienced person is using the gauge.

A gauge 70 for gauging female pipe threads constructed according to this invention is shown in Figs. 6 through 10. Although different in appearance, it is actually very similar to the male gauge 20. The gauge 70 comprises an elongated body 71 which is rhombohedral at one end and cylindrical at the other end. A tapered pipe thread 72 is machined on the cylindrical end and is undercut at the root and flattened at the crest similar to the thread 23 in the male thread gauge 20 so that it engages only the inclined side portions, at substantially the pitch diameter, of the female thread to be gauged. The upper portion of the body 71 is cut away as indicated at 73 to form two windows through which the plungers 74, 75 and 76 are visible. The plungers 75 and 76 perform the same functions as the plungers 30 and 31 in the preferred embodiment, while the plunger 74 replaces the stepped portions 24 and is used to determine the basic pitch diameter.

Since the gauge thread 72 and the thread 83 to be gauged are both tapered, the distance which the thread 72 may be screwed into the female thread 83 will depend on the effective pitch diameter of the thread 83. The lower end 77 of the plunger 74 has a smaller diameter than the remainder of the plunger and projects beyond the bottom of the rhombohedral portion of the body 71 when the plunger is pressed downwardly. The plunger 74 is urged upwardly by a spring 78 which is similar to the springs 36 and 37 in the male thread gauge. Longitudinal motion of this plunger is limited by a pin 80 and slot 81 the same as the plungers in the male gauge. When the plunger 74 is pressed downwardly, the lower end 77 thereof projects beyond the rhombohedral portion 71 of the body and engages the mouth of the threaded opening 83 in the workpiece 84. Thus the distance that the gauge 70 is screwed into the workpiece 84 and the effective pitch diameter may be determined by observing the position of the witness line 85 when the plunger is depressed. A movably mounted plate 86 suitably inscribed with the tolerances of pitch diameter is mounted in the window 73 adjacent to the plunger 74, giving a ready indication of the effective pitch diameter of the thread.

The plunger 75 performs the same function as the plunger 30 in the male thread gauge and is similar in construction except that the feeler surface 87 is disposed at the bottom of the plunger on the smaller diameter portion and is formed on a separate element which is pressed into a slot (not shown) in the side of the plunger. The feeler surface 87 is inclined so as to have the same taper as the thread 83 in the workpiece 84. The length of the surface 87 may be any desired length. In the embodiment shown it is substantially the same length as the thread 83, but if a particular portion of the thread is found to be critical, the use of a shorter feeler surface 87 restricted to the critical area is preferred. A stop pin 88 mounted in the body 71 projects through an elongated slot (not shown) in the lesser diameter portion of the plunger and serves to prevent rotation of the plunger and limit vertical motion thereof.

When the plunger 75 is pressed downwardly, the gauge having been screwed into the work, downward motion is checked when the surface 87 contacts the crests of the female thread. Since the gauge is supported only at the pitch diameter, the extent of downward motion of the plunger 75 is proportional to the distance between the pitch diameter and the crest diameter. A movably mounted plate 90 in the window 73 alongside the plunger 75 performs the same function as the plate 45 in the male thread gauge to indicate the crest condition.

The plunger 76 is substantially cylindrical over its entire length and has an inclined bore 91 therein opening from the lower end. An elongated slot 92 is provided approximately at the center of the plunger through which a pin 93 supported in the body passes. This pin serves to retain the plunger 76 in the body and allows vertical movement the same as the pin 88. A smaller diameter bar 94 is slipped into the bore 91 and has a round hole (not shown) therethrough through which the pin 93 extends. Thus the bar 94 is longitudinally fixed and may not move up and down but may move horizontally along the pin 93. A coil spring 89 is disposed at the upper end of the bore 91 and bears against the top of the bar 94 and the plunger 76 to urge the plunger upwardly. When the plunger is pressed downwardly, the bar 94 is caused to move outwardly due to the fact that the bore 91 is inclined with respect to the axis of the plunger 76. At the lower end of the bar a plurality of root-engaging feeler members 95 are provided which move outwardly to engage the roots of the thread 93 when the plunger 76 is pressed. The feelers 95 are wedge-shaped, having the same angular and dimensional characteristics as the feelers 50 in the male thread gauge so that they engage only the root portion of the thread. Thus the difference between the root diameter and the pitch diameter of the thread 83 determines the distance the plunger 76 may move downwardly the same as in the male thread gauge. To give a visual indication of the root condition, a witness line 96 and adjustable scale 97 are provided the same as for the other plungers.

To gauge a female thread, the inspector merely screws the thread 72 into the female thread until snug. He then depresses the plunger 74 until its lower end strikes the workpiece 84 to check the effective pitch diameter referring to the witness line 85 and the scale 86. The plunger 75 may then be depressed until the feeler surface 87 strikes the crest of the thread to measure the distance between the crest and the pitch diameter. This value is indicated on the scale 90. Next the plunger 76 may be depressed to move the bar 94 and feelers 95 outwardly until the ends of the feelers engage the root of the female thread. The difference between the pitch diameter and the root diameter will then be indicated on the scale 97. Thus the three basic qualities of the female thread may be readily determined in much the same manner as with the male thread gauge.

To calibrate the male thread gauge 20 it is preferred to employ a carefully made plug gauge having a known basic pitch diameter, root, depth, and crest height. This plug is screwed into the gauge 20. The undercut portion 25 and the raised portion 26 on the gauge 20 are then ground away or built up to define the proper limits. Next the plungers 30 and 31 are depressed, and the scale plates 45 and 55 are adjusted so that the tolerance limits will be properly represented by the lines on these plates. As the gauge 20 wears, the standard plug may be used to reposition the plate 45 and 55 to accommodate for the wear.

The female thread gauge 70 is preferably calibrated by use of a ring gauge having a thread whose characteristics are known. The gauge 70 is screwed into the ring gauge until snug and the three plungers are depressed one at a time so that the three scale plates may be adjusted to indicate the tolerance limits in the same manner as the male thread gauge.

From the foregoing it will be apparent that an improved pipe thread gauge has been provided which not only increases the speed of the gauging operation but also results in more accurate gauging even when inexperienced inspectors are employed. The gauge of this invention is simple to construct, rugged in service, and may be readily calibrated at any time to compensate for wear.

Various changes or modifications, such as will present themselves to those familiar with the art, may be made without departing from the spirit of this invention whose scope is commensurate with the following claims.

What is claimed is:

1. A gauge for male threads comprising a body having a tapered threaded opening therein said thread being relieved at its crest and a bore in said body intersecting the opening tangentially at one side thereof and at right angles to a plane which includes the axis of the threaded opening and the point of intersection, a reciprocable plunger in said bore having a feeler surface thereon, the feeler surface on said plunger being substantially wedge-shaped so as to contact only the root portion of the thread to be gauged, said feeler surface also being inclined with respect to the axis of the bore so that reciprocal motion of said plunger changes the relative position of the feeler surface with respect to the central opening, and means for indicating the relative position of said plunger to give a visual indication of the condition of the root of the thread being gauged.

2. A gauge for male threads comprising a body having a tapered threaded opening therein and a bore in said body intersecting said opening tangentially thereto at one side thereof and at a right angle to the axis of the threaded opening, a reciprocable plunger in said bore having a feeler surface thereon movable in a direction tangential to the thread, the feeler surface being substantially flat so as to contact only the crest of a thread to be gauged screwed into the threaded opening, the feeler surface also being inclined with respect to the axis of the bore so that reciprocal motion of said plunger changes the relative position of the feeler surface with respect to the threaded opening, and means for indicating the relative position of said plunger to give a visual indication of the condition of the crest of the thread being gauged.

3. A gauge for male pipe threads comprising a body having an opening therethrough, a tapered thread in said opening undercut at the root and relieved at the crest thereof, means at the small diameter end of said opening for indicating the length of a thread to be gauged which is screwed into the first mentioned thread including a plurality of steps to give a visual indication of the effective pitch diameter of the thread to be gauged, and means slidable tangentially with respect to the opening and having a feeler contour thereon for engaging the root of the thread to indicate the condition of the root of the thread with respect to the effective pitch diameter.

4. A gauge for male pipe threads comprising a body having an opening therethrough, a tapered thread in said opening, said thread being undercut at the root and flat at the crest so as to contact only the inclined side portions of the thread to be gauged, step means on said body at the small diameter end of said opening for indicating the length of said thread to be gauged which is screwed into the first mentioned thread to give a visual indication of the effective pitch diameter of said thread, and means slidable tangentially with respect to the opening and having a feeler contour thereon for engaging the root of the thread to indicate the condition of the root of the thread with respect to the effective pitch diameter.

5. A pipe thread gauge comprising a body having a thread thereon having an undercut root portion and flattened crest portion for engaging the intermediate side portions of a mating thread to be gauged, means for indicating the basic pitch diameter of the mating thread when engaged by the first-mentioned thread, a movable element supported in said body and having a surface thereon for engaging a portion of the crest of the thread to be gauged, a second movable element mounted in said body having a surface thereon for engaging the root of a thread to be gauged, and means for indicating relative positions of said movable elements when said root and crest are engaged by the surfaces.

6. A pipe thread gauge comprising a body having a tapered thread thereon for engaging a mating tapered thread to be gauged, the thread on said gauge being undercut at its root and relieved at its crest so as to engage only the intermediate side portions of the thread to be gauged leaving the root and crest clear, means for indicating the basic pitch diameter of the thread to be gauged, a pair of movable elements supported in said body movable along parallel lines tangential to said thread, one of said elements having a surface thereon for engaging a portion of the crest of the thread to be gauged, the other of said elements having a surface thereon for engaging a portion of the root to be gauged, and means for indicating the relative position of each of said movable elements to give a visual indication of the degree of root and crest truncation.

7. A pipe thread gauge comprising a body having an undercut thread thereon for engaging only the side portions of a mating thread to be gauged, a movable element reciprocably supported in said body for movement in a direction tangential to the thread and having a surface thereon for engaging the root of the thread to be gauged, said tangential movement being in a direction perpendicular to a plane including the axis of said undercut thread and said engagement of said surface and the root of the thread to be gauged, means for indicating the relative position of said movable element when said root is engaged by said surface, a second movable element supported in said body for movement in a direction parallel to the direction of movement of the first element and having a surface thereon for engaging the crest of the thread to be gauged, means for indicating the relative position of said second movable element when said crest is engaged by said surface, and means for indicating the length of engagement of the two threads to indicate the basic size of the thread being gauged.

8. A gauge for male pipe threads comprising a body having an opening therethrough, a tapered thread in said opening, said thread having an undercut root portion and flattened crest portion, step means cut in the body at the small diameter end of said opening for indicating the length of a thread to be gauged which is screwed into the first-mentioned thread, one of said steps being flush with the body at the end of said opening, and means slidable tangentially with respect to the opening and having a feeler contour thereon for engaging the root of the thread to indicate the condition of the root of the thread with respect to the effective pitch diameter.

References Cited in the file of this patent

UNITED STATES PATENTS

| | | |
|---|---|---|
| 2,218,111 | S. Johnson | Oct. 15, 1940 |
| 2,339,699 | Husband | Jan. 18, 1944 |
| 2,387,814 | Straw | Oct. 30, 1945 |
| 2,435,268 | Childs | Feb. 3, 1948 |
| 2,437,160 | P. Johnson | Mar. 2, 1948 |
| 2,476,189 | Guetzkow | July 12, 1949 |
| 2,487,677 | Steczynski | Nov. 8, 1949 |
| 2,556,564 | Troedson | June 12, 1951 |
| 2,624,125 | Johnson | Jan. 6, 1953 |

FOREIGN PATENTS

| | | |
|---|---|---|
| 389,690 | Germany | Feb. 13, 1924 |
| 275,875 | Great Britain | Aug. 18, 1927 |

OTHER REFERENCES

Publication, "Sheffield Gages," Bulletin No. FL-1-45, Sheffield Corp., Dayton 1, Ohio.